US011939198B2

(12) United States Patent
Soder

(10) Patent No.: US 11,939,198 B2
(45) Date of Patent: *Mar. 26, 2024

(54) TRANSPORTING SYSTEM FOR TRANSPORTING A CONTAINER, AND METHOD FOR OPERATING A PRODUCTION INSTALLATION HAVING A TRANSPORTING SYSTEM

(71) Applicant: SEW-EURODRIVE GMBH & CO. KG, Bruchsal (DE)

(72) Inventor: Johann Soder, Hambrücken (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 268 days.

This patent is subject to a terminal disclaimer.

(21) Appl. No.: 17/158,061

(22) Filed: Jan. 26, 2021

(65) Prior Publication Data

US 2021/0147203 A1 May 20, 2021

Related U.S. Application Data

(63) Continuation of application No. 16/095,592, filed as application No. PCT/EP2017/025067 on Mar. 28, 2017, now Pat. No. 10,899,591.

(30) Foreign Application Priority Data

Apr. 22, 2016 (DE) ..................... 10 2016 004 883.2

(51) Int. Cl.
*B66F 9/06* (2006.01)
*B65G 67/24* (2006.01)
*B65G 65/00* (2006.01)

(52) U.S. Cl.
CPC .............. *B66F 9/063* (2013.01); *B65G 67/24* (2013.01); *B65G 65/00* (2013.01)

(58) Field of Classification Search
None
See application file for complete search history.

(56) References Cited

U.S. PATENT DOCUMENTS

| 5,903,457 A | 5/1999 | Chang |
| 5,953,234 A | 9/1999 | Singer et al. |
| | (Continued) | |

FOREIGN PATENT DOCUMENTS

| CN | 101999102 A | 3/2011 |
| CN | 102341322 A | 2/2012 |
| | (Continued) | |

OTHER PUBLICATIONS

International Search Report dated Jun. 29, 2017, in International Application No. PCT/EP2017/025067 (English-language translation).

(Continued)

*Primary Examiner* — Mark C Hageman
(74) *Attorney, Agent, or Firm* — Carter, DeLuca & Farrell LLP

(57) ABSTRACT

In a transporting system for transporting a container, and a method for operating a production installation having a transporting system, the transporting system has a vehicle and a transport vehicle, on whose frame two wheel drives are disposed, which are set apart from each other and have a wheel in each case, in particular, the two wheels are disposed so as to touch a floor in order to generate traction force for the transport vehicle, in particular, the wheel axles of the two wheels are aligned parallel to each other. A first and a second shoulder part are situated and/or provided on the frame, and the first shoulder part is situated at a distance from the second shoulder part, and a space region is situated between the wheel drives and between the shoulder parts, into which the vehicle together with the container it accommodates is able to be driven and out of which the vehicle (Continued)

together with the container may be driven. The container has a width that is greater than the distance, in particular the smallest distance, between the shoulder parts, the vehicle has a lifting device, and the vehicle is able to be driven into the space region when the lifting device is lowered and also when it is raised. When the lifting device is raised, the container is able to be positioned above the shoulder parts on the vehicle, and when the lifting device is lowered, the container may be positioned so as to sit on the shoulder parts.

22 Claims, 5 Drawing Sheets

(56) References Cited

U.S. PATENT DOCUMENTS

| | | | |
|---|---|---|---|
| 6,213,025 | B1 | 4/2001 | Sauerwein et al. |
| 7,073,634 | B2 | 7/2006 | Mitchell et al. |
| 8,060,254 | B2 | 11/2011 | Myeong et al. |
| 8,075,243 | B2 | 12/2011 | Chilson et al. |
| 9,383,755 | B2 | 7/2016 | Barwick et al. |
| 9,514,430 | B2 | 12/2016 | Miette et al. |
| 9,792,577 | B2 | 10/2017 | Mountz et al. |
| 9,811,796 | B2 * | 11/2017 | Ogilvie ............... B66C 1/02 |
| 9,850,066 | B2 | 12/2017 | Salichs et al. |
| 9,971,351 | B2 * | 5/2018 | Deutscher ............ G05D 1/0011 |
| 10,351,344 | B2 | 7/2019 | Gebhardt et al. |
| 10,351,346 | B2 | 7/2019 | Otto et al. |
| 2005/0149256 | A1 | 7/2005 | Lawitzky et al. |
| 2013/0129456 | A1 | 5/2013 | Salichs et al. |
| 2016/0129592 | A1 | 5/2016 | Saboo et al. |
| 2017/0066592 | A1 * | 3/2017 | Bastian, II ............... B25J 5/007 |
| 2017/0267452 | A1 | 9/2017 | Goren et al. |
| 2018/0186582 | A1 | 7/2018 | Borders et al. |
| 2018/0305122 | A1 | 10/2018 | Moulin et al. |

FOREIGN PATENT DOCUMENTS

| | | |
|---|---|---|
| CN | 202394114 U | 8/2012 |
| CN | 103782247 A | 5/2014 |
| CN | 105225090 A | 1/2016 |
| DE | 3413255 A1 | 10/1985 |
| DE | 19626966 A1 | 1/1998 |
| DE | 102014012254 A1 | 2/2016 |
| EP | 1687219 B1 | 11/2009 |
| FR | 2996788 A1 | 4/2014 |
| JP | S6413514 U | 1/1989 |
| KR | 100843085 B1 | 7/2008 |
| WO | WO 2013135227 A1 | 9/2013 |
| WO | WO 2016026910 A1 | 2/2016 |

OTHER PUBLICATIONS

U.S. Appl. No. 62/231,092, filed Jun. 24, 2015.
U.S. Appl. No. 62/302,070, filed Mar. 1, 2016.

* cited by examiner

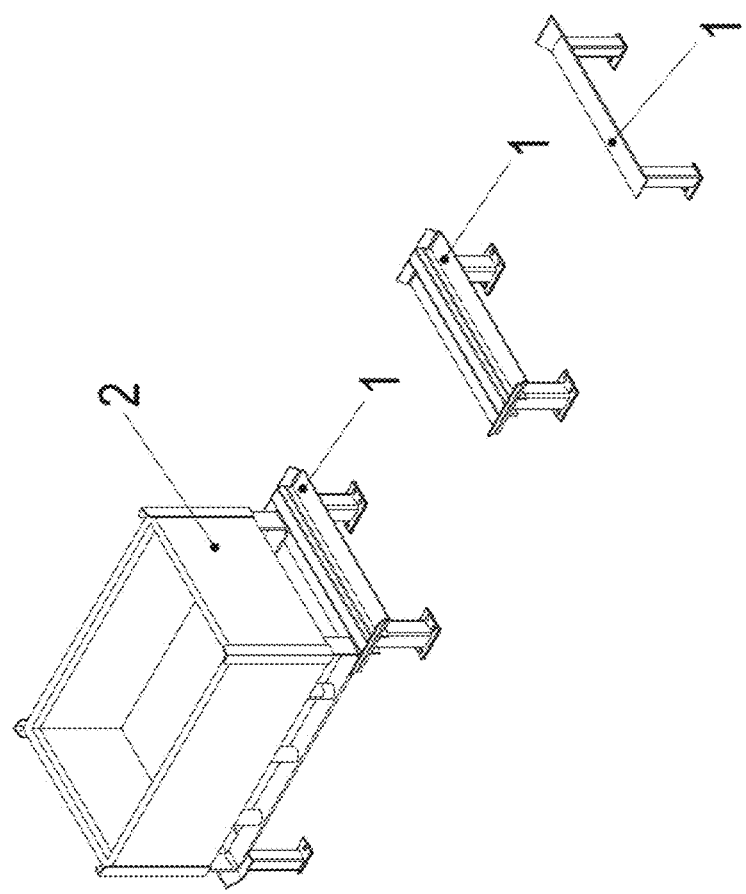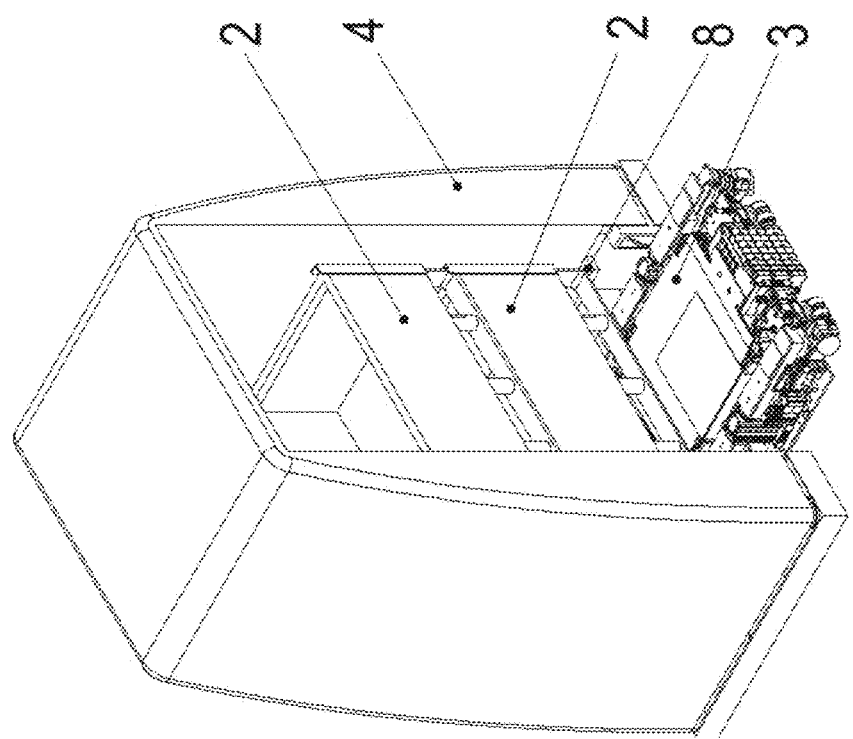
Fig. 2

TRANSPORTING SYSTEM FOR TRANSPORTING A CONTAINER, AND METHOD FOR OPERATING A PRODUCTION INSTALLATION HAVING A TRANSPORTING SYSTEM

CROSS-REFERENCE TO RELATED APPLICATIONS

The present application is a continuation of U.S. patent application Ser. No. 16/095,592, which is the national stage of PCT/EP2017/025067, having an international filing date of Mar. 28, 2017, and claims priority to Application No. 102016004883.2, filed in the Federal Republic of Germany on Apr. 22, 2016, each of which is expressly incorporated herein in its entirety by reference thereto.

FIELD OF THE INVENTION

The present invention relates to a transporting system for transporting a container and to a method for operating a production installation having a transporting system.

BACKGROUND INFORMATION

Certain transporting systems for transporting a container are conventional. Conveyor lines, i.e. conveyor belts, for example, may be provided for this purpose.

Example embodiments of the present invention provide a transporting system for a logistical transport.

According to an example embodiment of the invention, a transporting system for transporting a container includes a vehicle and a transport vehicle on whose frame two wheel drives are provided, which are set apart from each other and have a wheel in each case, in particular, the two wheels are disposed so as to touch a floor in order to generate a traction force for the transport vehicle, in particular, the wheel axles of the two wheels are aligned in parallel with each other. A first and a second shoulder part are disposed and/or provided on the frame, the first shoulder part being set apart from the second shoulder part, and a space region is situated between the wheel drives and between the shoulder parts, into which the vehicle together with the container it is carrying is able to be driven in and out of which the vehicle together with the container is able to be driven, the container having a width that is greater than the distance, in particular the smallest distance, between the shoulder parts.

The vehicle has a lifting device and the vehicle is able to be driven into the space region when the lifting device is lowered and also when it is raised. The container is able to be placed above the shoulder parts on the vehicle when the lifting device is raised, and when the lifting device is lowered, the container may be placed so that it sits on the shoulder parts.

This has the advantage that the vehicle may be driven into the space region in the transport vehicle when the lifting device is raised, the container being situated above the shoulder parts, i.e. at a greater distance from the floor than the shoulder parts. Because of the lowering of the lifting device, and thus the lowering of the container, this container is down on the shoulder parts on account of its sufficient width. The width of the container refers to the extension of the container in the direction of the shortest connection line between the two shoulder parts. The vehicle including its lifting device has a sufficiently small width to allow the lifting device to be raised or lowered in the clearance region between the shoulder parts. As a result, it is possible to transfer a container, which is accommodated on a lifting device of the vehicle, to the transport vehicle, which has a protective frame including a housing. As a minimum, the housing of the transport vehicle surrounds the container not only from the sides but also from above, i.e. as a roof, as well. In this manner, the container is able to be protected from precipitation. After the vehicle has been driven out of the space region, the transport vehicle is freely maneuverable on the floor, which thus means, for example, that it is also able to be driven into a truck or into a freight train wagon.

A transport inside a building is therefore able to be carried out with the aid of the vehicle, and a transport outside the building may be carried out with the aid of the transport vehicle.

Transport goods are storable in the container.

According to an example embodiment of the present invention, a logistical transport is therefore able to be carried out in an intralogistical transport, i.e. a transport inside a building, and an outside transport in the environment.

The intralogistical transport may be carried out using a cost-effective and simple vehicle equipped with a lifting device. The outside transport may be provided using a transport vehicle that provides protection from environmental effects. The transport vehicle is provided with a protective housing for this purpose, which especially includes an activatable cover, i.e. a roller-type shutter door or door or the like.

The first and the second shoulder parts may be arranged as two tracks that extend parallel to each other, the track direction in particular extending parallel to the driving direction of the vehicle relative to the transport vehicle when the vehicle is entering or leaving. This has the advantage of offering a stable support for the container.

The space region may be closed off by a cover, in particular such that the stored containers are disposed so as to be protected from precipitation from the environment. This has the advantage that the container is able to be transported outdoors. The cover may be arranged as a roller-type shutter door, a door, etc. The cover has to be able to be deactivated so that the space region for the vehicle is freely accessible. A protective closing of the space region is possible only when the cover is activated.

The two shoulder parts, in particular the contact faces of the container and of the shoulder parts, may have the same distance from the floor. This is considered advantageous inasmuch as the container is able to be set down on the shoulder parts without tilting provided the container has a planar bearing surface on its underside, it being able to be placed on the shoulder parts via the bearing surface.

The vehicle may be able to drive underneath the shoulder parts, in particular when the lifting device is lowered. This offers the advantage of allowing a vehicle to drive underneath the load without making contact. Thus, after the vehicle has entered, the lifting device is able to be raised, which then allows the container to be lifted.

The wheel drives may be disposed on the frame of the transport vehicle in a linearly mobile manner, and in particular are slidingly or resiliently supported. This offers the advantage that it is not the entire weight of the transport vehicle that is conducted via the wheels but only the weight of the wheel drives.

The transport vehicle may have castors for conducting the weight force of the transport vehicle, which is reduced by the weight force of the wheel drives, and in particular the space region is disposed between the castors. This offers the advantage that the castors are able to be configured in a correspondingly cost-effective and sturdy manner so that a substantial share of the weight force is able to be conducted to the floor via the castors.

The wheel drives may have an electric motor in each case, and an energy store, which can be fed via a secondary winding, is able to supply the electric motors, which offers the advantage of allowing for an inductive transmission of electrical energy from the direction of the floor to the transport vehicle.

The secondary winding may be able to be inductively coupled with a primary conductor disposed on the floor. This is considered advantageous insofar as a contact-free inductive energy supply is able to be provided.

A capacity may be connected to the secondary winding in series or in parallel, the resonant frequency of the oscillating circuit created in this manner corresponding to the frequency of the alternating current impressed into the primary conductor. This has the advantage of achieving a high efficiency in the inductive transmission of electrical energy.

The transport vehicle may include a control, which is connected to a position-detection system of the transport vehicle and/or to distance sensors of the transport vehicle. This is considered advantageous inasmuch as it allows for an uncomplicated navigation.

According to an example embodiment of the present invention, a method for operating a production installation having a transporting system includes a first method step, in which the transport vehicle, which particularly was delivered by an infrastructure vehicle, drives autonomously past a sensor of the production installation, in particular through an entrance gate of the production installation, and into a transfer zone, the sensor in particular has an RFID reader device, and with the aid of the sensor, an item of information pertaining to the goods held in a container, in particular transport goods, is transmitted to a central processor of the production installation, energy is supplied, in particular inductively, to the transport vehicle in the transfer zone in order to charge its energy store. In a following method step, the transport vehicle autonomously drives to an assembly cell, the vehicle removes at least one container from the transport vehicle and transports it to one of the workstations of the assembly cell, where the vehicle sets down the container, in particular on a bearing block of the respective workstation, and an item of goods, in particular an item of transport goods, is removed from the container in order to manufacture a product at the respective workstation.

This is considered advantageous inasmuch as no storage facility is required for the containers transported by the transport vehicle but instead the transport vehicle itself is able to be used as a storage area, in particular inside the transfer zone. A high-bay racking is therefore able to be dispensed with or may at least have a smaller configuration if classic logistical method steps are used in addition, parallel to the described transport vehicle and its utilization.

After the container has been emptied, it may be picked up by the vehicle and stored in a transport vehicle, or the transport vehicle, which especially drives in an autonomous manner across the transfer zone and past the sensor out of the production installation, in particular to a further infrastructure vehicle. This offers the advantage that an empties circuit may easily be provided that the transport vehicles are able to be used not only for delivering goods but also for carrying empty containers away.

Further features and aspects of example embodiments of the present invention are described in greater detail below with reference to the Figures.

BRIEF DESCRIPTION OF THE DRAWINGS

FIG. 2 shows a second status of the system, where containers 2 are set down on a shoulder 8 of transport vehicle 4 and vehicle 3 drives out of transport vehicle 4.

DETAILED DESCRIPTION

As illustrated in the Figures, the intralogistical system according to an example embodiment of the present invention has a vehicle 3, which is able to be maneuvered on the floor and has a receptacle, in particular a plate, that is able to be raised or lowered.

Thus, it is possible to drive underneath a container 2, i.e. a container, which is supported on bearing blocks 1, the container being able to be accommodated by raising the liftable receptacle. This is so because container 2 is simply set down on bearing blocks 1 from above and may thus be removed from the bearing blocks by lifting with the aid of the receptacle of vehicle 3.

Figure 1:
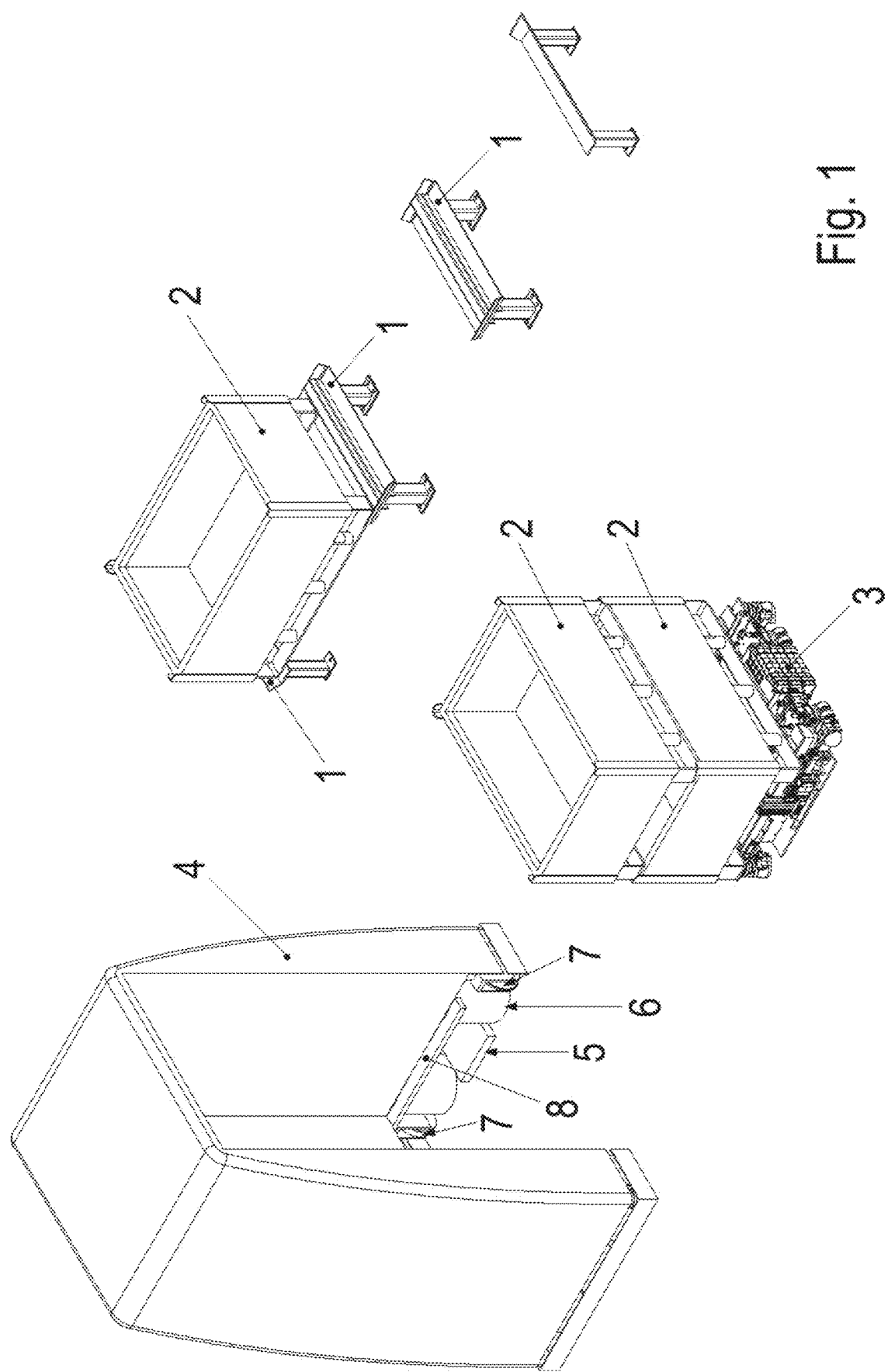
FIG. 1 shows a first status of an intralogistical system, which includes a transport vehicle 4 and a vehicle 3 that transports a container 2.

As illustrated in FIG. 1, vehicle 3 together with the accommodated containers 2 then drives into a transport vehicle 4, which is arranged in the shape of a capsule. Transport vehicle 4 has its own castors 7 so that the weight of the transport vehicle is substantially absorbed by castors 7. The castors are supported in a rotatable manner so that transport vehicle 4 is able to move on the floor. Castors 7 are connected to the frame of transport vehicle 4 by an axle and consequently always rotate according to the driving direction.

Transport vehicle 4 also includes a control, which controls drives 5 driving wheels. These wheels induce the traction. Steering, i.e. a change in the direction of traction, is able to be achieved by differences in the rotational frequency of wheels that are disposed opposite each other.

The wheels are pressed against the floor only to such an extent that sufficient suction is present for inducing the propulsion. For example, the drive is slidingly or resiliently disposed on the frame of the transport vehicle so that only the weight force of the drive is conducted via the wheels to the floor.

At least one drive, which has at least one wheel in each case, is disposed on both sides of the particular space region entered by vehicle 3 in order to store containers 2 inside transport vehicle 4 or to remove them from there. As long as vehicle 3 remains inside transport vehicle 4, transport vehicle 4 does not move or moves merely parallel to vehicle 3.

Transport vehicle 4 has a housing part, which is connected to the frame of transport vehicle 4 and at least partially surrounds stored containers 2 in the manner of a housing.

A shoulder 8 is provided on both sides on the inner side of the housing part or frame of transport vehicle 4, a projecting section being formed, in particular. When the liftable receptacle is lowered, the containers projecting from vehicle on both sides are therefore set down on shoulder 8, which is arranged on both sides and, for example, in two parts. As a result, transport vehicle 4 transports containers 2 after vehicle 3 has been driven out of transport vehicle 4.

Shoulder 8 is set apart from the floor such that vehicle 3 is able to drive underneath containers 2. When the lifting axle is lowered, vehicle 3 is therefore able to drive underneath containers 2 stored in transport vehicle 4 and accommodate them by raising the lifting axle.

Figure 3:
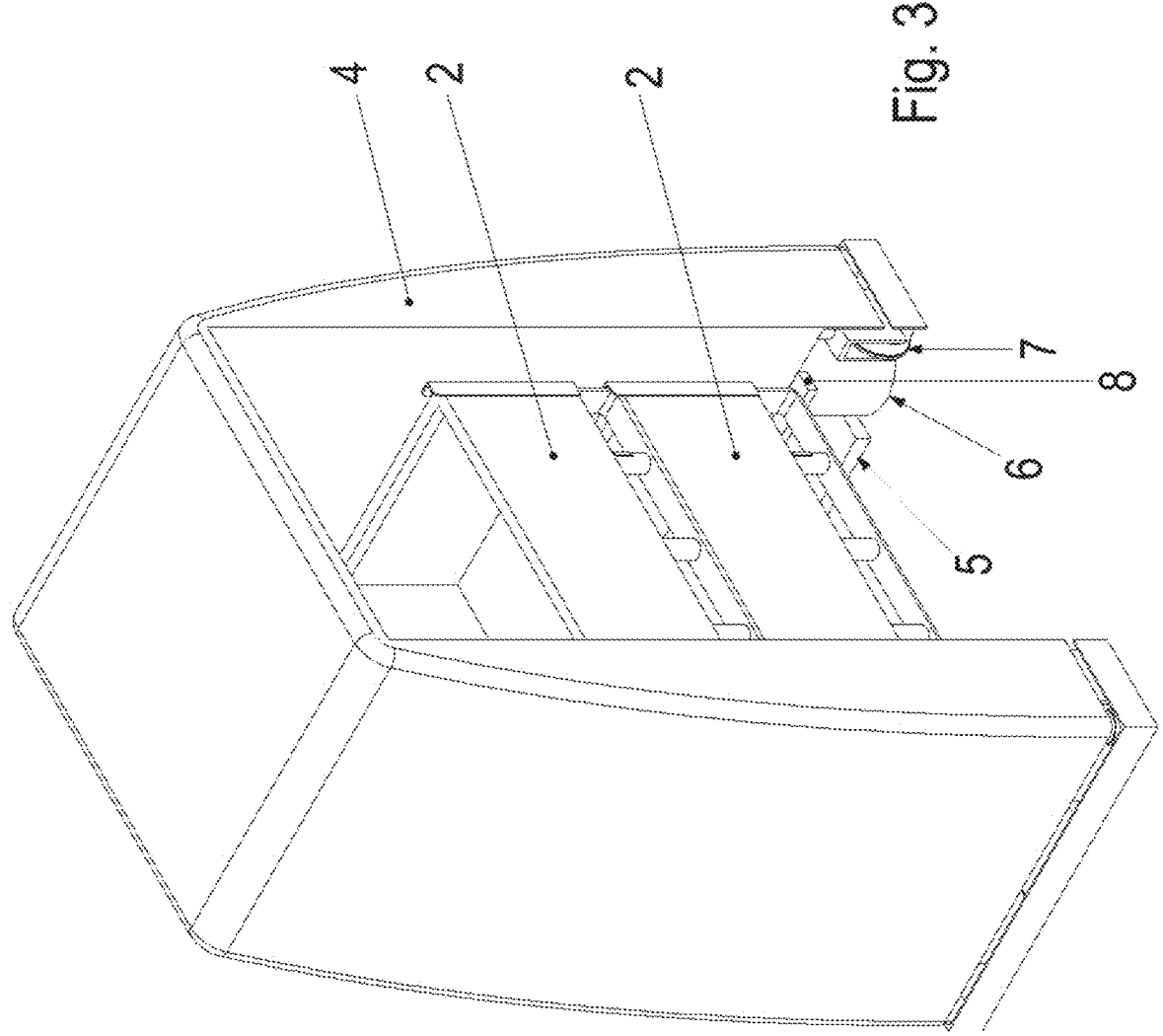
FIG. 3 shows an oblique view of transport vehicle 4 together with containers that have been stored inside transport vehicle 4 on shoulder 8.

As may be gathered from FIG. 3, the housing part of transport vehicle 4 covers containers 2 stored therein in the form of a roof.

The entry region provided for vehicle 3 is able to be locked with the aid of a cover 40, in particular a roller-type shutter door, i.e. a roller-type shutter gate, so that containers 2 inside transport vehicle 4 are protected from precipitation or dirt of the environment when cover 40 is activated. In order to allow vehicles 3 to drive into transport vehicle 4, cover 40 is deactivated, thereby making the entry area accessible to vehicle 3.

Two driven wheels together with their drives 6 are mounted on the frame of the transport vehicle such that a vehicle 3 together with containers 2 is able to be driven into transport vehicle 4; the lifting axle is raised for this purpose so that containers 2 are disposed above shoulder 8. In addition, vehicle 3 is located between the two wheels, i.e. the connection line, especially each connection line, of the two wheels intersects with vehicle 3.

The minimum mutual distance between the two shoulder parts 8 is smaller than the width of containers 2.

The floor is, for example, arranged as a planar surface. It therefore represents a maneuvering plane for transport vehicle 4 and vehicle 3.

Figure 4:
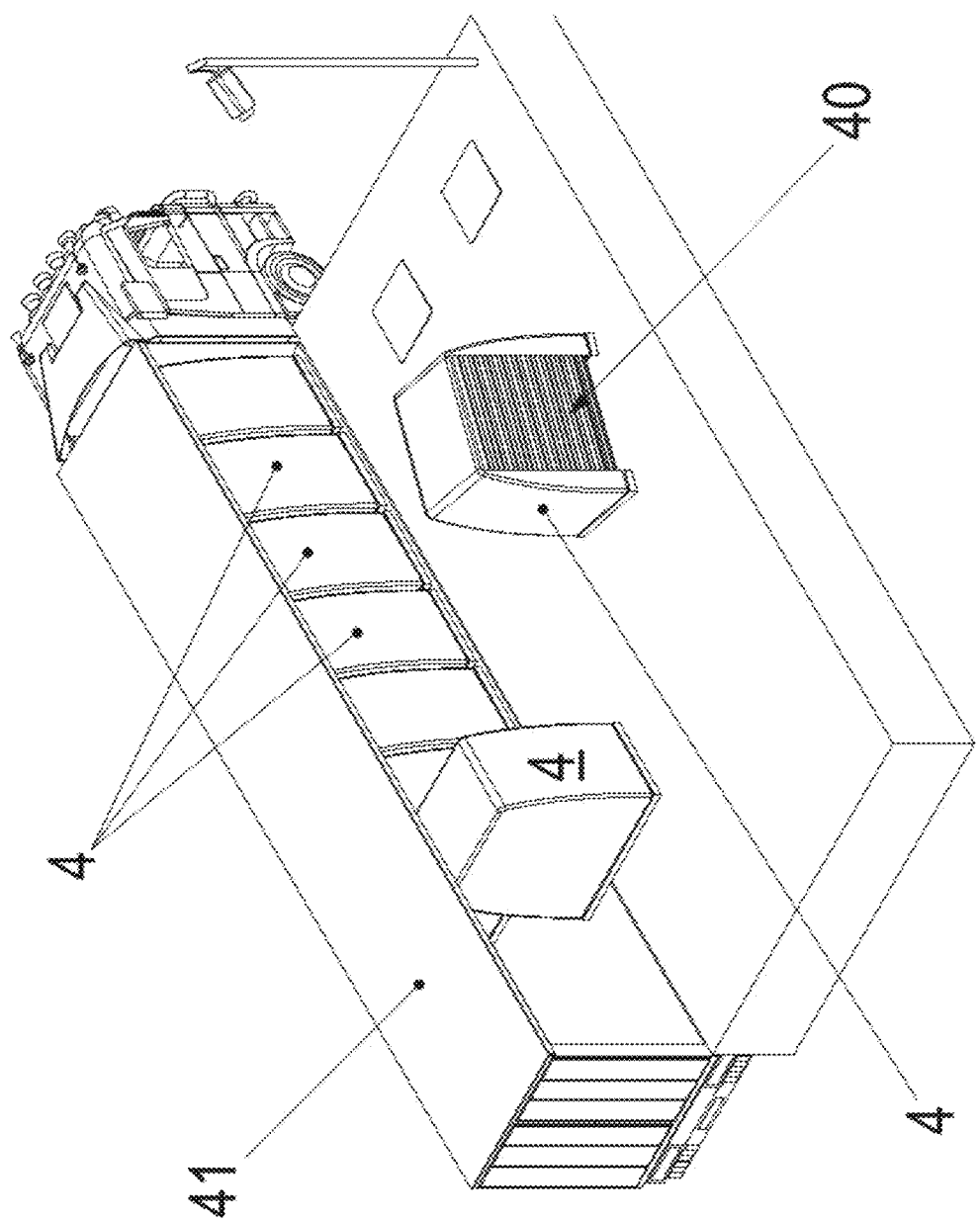
FIG. 4 shows a commercial truck 41, into which transport vehicles have been driven and thus accommodated.

As illustrated in FIG. 4, transport vehicles 4 of the type illustrated in FIGS. 1 through 4 are able to be stored inside a truck 41; transport vehicles 4 control the entry into trucks 41 on their own, i.e. autonomously, and then park next to each other. A high density of transport vehicles 4 is therefore able to be achieved.

Figure 5:
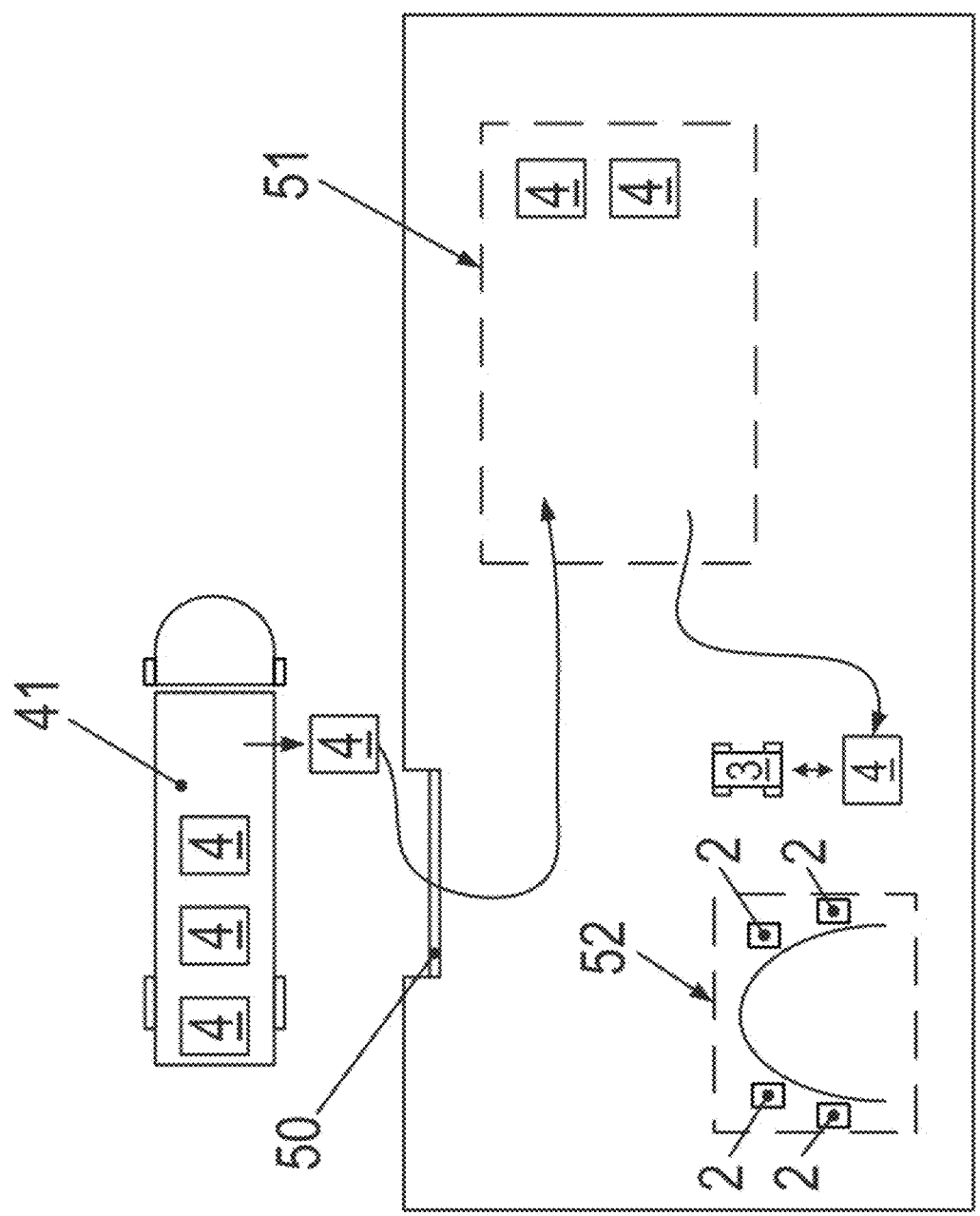
FIG. 5 illustrates the use of the intralogistical system for a production installation.

As illustrated in FIG. 5, the intralogistical system may be used in a production installation inasmuch as a storage facility, e.g., a high-bay racking, is able to be saved or may at least have a smaller configuration.

The reason is that transport vehicles 4 are delivered with the aid of an infrastructure vehicle such as truck 41 and/or with the aid of a rail vehicle. Transport vehicles 4 drive autonomously out of the delivering infrastructure vehicle and then move through an entrance gate of the production installation. A sensor 50 is situated at this entrance gate, which detects transport vehicle 4 when it passes through the entrance gate and detects the goods contained in containers 2 transported by transport vehicle 4. This is accomplished with the aid of RFID tags, for example, which are read out by a reader device included by sensor 50. Alternatively, it is also possible to provide each container 2 with an RFID tag, which includes the information about the goods stored in the container, and a reader device, included by sensor 50, reads out the RFID tags.

In this manner, it is made known to the central control of the production installation which goods are held in respective transport vehicle 4.

Transport vehicle 4 then drives into a transfer zone 51, where it parks at a respective charge station and is able to be supplied with energy. Primary conductors acted upon by an alternating current are installed in the floor for this purpose so that a secondary winding disposed on the underside of a respective transport vehicle 4, and thus an energy store of the transport vehicle, is able to be inductively supplied by the respective primary conductor.

A product is manufactured in an assembly cell 52 of the production installation, which includes a plurality of workstations serially disposed in a U-shape, and a respective manufacturing step is carried out at each workstation.

At least one container 2, which was removed from transport vehicle 4 with the aid of vehicle 3 and transported to the respective workstation of assembly cell 52, is stored at a respective workstation of the assembly cell. During the manufacturing step at the respective workstation, an item of goods required for the manufacturing step is removed from container 2 stored at the workstation and is used for manufacturing the product.

Empty containers 2 are picked up by vehicle 3 and stored inside a transport vehicle 4, which then leaves the production installation via transfer zone 51 in the direction of a further infrastructure vehicle.

Instead of the U-shaped arrangement, it is also possible to use some other serial arrangement of the workstations in other exemplary embodiments according to the present invention.

As schematically indicated in FIG. 1, the wheel drives 6 may have an electric motor 10 in each case, and an energy store 11, which can be fed via a secondary winding 12, is able to supply the electric motors 10.

As schematically indicated in FIGS. 1 and 5, the secondary winding 12 may be able to be inductively coupled with a primary conductor 13 disposed on the floor 14.

As schematically indicated in FIGS. 1 and 5, a capacitance 15 may be connected to the secondary winding 12 in series or in parallel, the resonant frequency of the oscillating circuit created in this manner corresponding to the frequency of the alternating current impressed into the primary conductor 13.

As schematically indicated in FIG. 1, the transport vehicle 4 may include a control 16, which is connected to a position-detection system 17 of the transport vehicle 4 and/or to distance sensors 18 of the transport vehicle 4.

LIST OF REFERENCE NUMERALS 1 bearing block
2 container
3 vehicle
4 transport vehicle
5 secondary winding
6 drive with drive wheels
7 castors
8 shoulder, in particular projecting section of the housing part of transport vehicle 4
10 electric motor
11 energy store
12 secondary winding
13 primary conductor
14 floor
15 capacitance
16 control
17 position-detection system
18 distance sensor
40 cover
41 truck
50 sensor
51 transfer zone
52 assembly cell having a plurality of workstations serially disposed in a U-shape

What is claimed is:

1. A method for operating a production installation having a transporting system, comprising:

autonomously driving a transport vehicle past a sensor of the production installation and into a transfer zone;

transmitting, with the aid of the sensor, an item of information about goods and/or transport goods held in a container to a central processor of the production installation;

autonomously driving the transport vehicle to an assembly cell;

removing, by a vehicle, at least one container from the transport vehicle;

transporting the container to a workstation of the assembly cell;

setting the container down at the workstation of the assembly cell; and removing an item of goods and/or an item of transport goods from the container to manufacture a product at the workstation;

wherein the transport vehicle includes a frame and two wheel drives provided on the frame, the two wheel drives set apart from each other, each wheel drive including a wheel;

wherein the frame includes a first shoulder part and a second shoulder part set apart from each other, a space region being arranged between the wheel drives and between the shoulder parts, the vehicle driving on a floor surface into and out of the space region and carrying the container into and out of the space region, the vehicle including a lifting device and driving into the space region when the lifting device is lowered and also when the lifting device is raised; and wherein the lifting device raises the container above the shoulder parts on the vehicle when the lifting device is raised and lowers the container to sit on the shoulder parts when the lifting device is lowered; and wherein the two wheels touch the floor surface to generate a traction force for the transport vehicle.

2. The method according to claim 1, further comprising delivering the transport vehicle by an infrastructure vehicle.

3. The method according to claim 1, wherein the autonomously driving step includes autonomously driving the transport vehicle through an entrance gate of the production installation.

4. The method according to claim 1, wherein the sensor includes an RFID reader device.

5. The method according to claim 1, further comprising supplying energy to the transport vehicle in the transfer zone to charge an energy store of the transport vehicle.

6. The method according to claim 1, further comprising inductively supplying energy to the transport vehicle in the transfer zone to charge an energy store of the transport vehicle.

7. The method according to claim 1, wherein the container is set down in the setting down on a bearing block of the workstation.

8. The method according to claim 1, further comprising emptying the container, and, after emptying the container, picking up the container by the vehicle and storing the container in a transport vehicle.

9. The method according to claim 8, further comprising, after storing the container in the transport vehicle, autonomously driving the transport vehicle out of the production installation.

10. The method according to claim 8, wherein the transport vehicle is autonomously driven across the transfer zone and past the sensor.

11. The method according to claim 10, wherein the transport vehicle is autonomously driven to a further infrastructure vehicle.

12. The method according to claim 1, wherein wheel axles of the two wheels are aligned parallel to each other.

13. The method according to claim 1, wherein the first and the second shoulder parts are arranged as two tracks that extend in parallel.

14. The method according to claim 13, wherein a track direction is parallel to a driving direction of the vehicle in relation to the transport vehicle when the vehicle is entering or leaving.

15. The method according to claim 1, wherein the space region is closable by a cover to protect stored containers from environmental precipitation.

16. The method according to claim 1, wherein the two shoulder parts, and/or contact faces of the container and the shoulder parts, have the same distance from the floor.

17. The method according to claim 1, wherein the vehicle drives underneath the shoulder parts and/or drives underneath the shoulder parts when the lifting device is lowered.

18. The method according to claim 1, wherein the wheel drives are arranged on the frame of the transport vehicle, are linearly mobile, and/or are supported in a sliding and/or resilient manner.

19. The method according to claim 1, wherein the transport vehicle includes casters that conduct a weight force of the transport vehicle, reduced by a weight force of the wheel drives.

20. The method according to claim 1, wherein, the space region is arranged between the casters.

21. The method according to claim 1, further comprising performing a manufacturing operation, at the workstation, on the item of goods and/or the item of transport goods removed from the container.

22. The method according to claim 1, further comprising manufacturing the product by performing a manufacturing operation, at the workstation, on the item of goods and/or the item of transport goods removed from the container.

* * * * *